H. O. STEPHENS.
ELECTRIC APPARATUS.
APPLICATION FILED DEC. 18, 1916.
1,345,712.
Patented July 6, 1920.
2 SHEETS—SHEET 1.
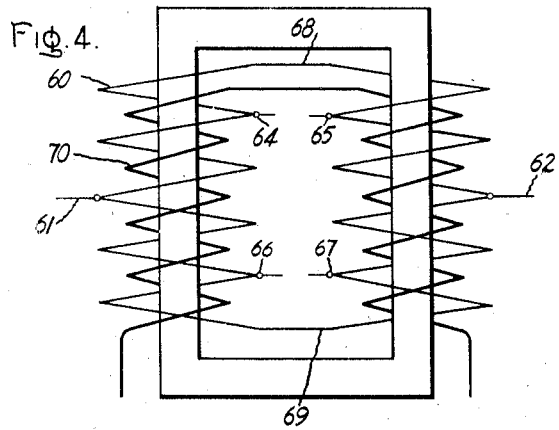
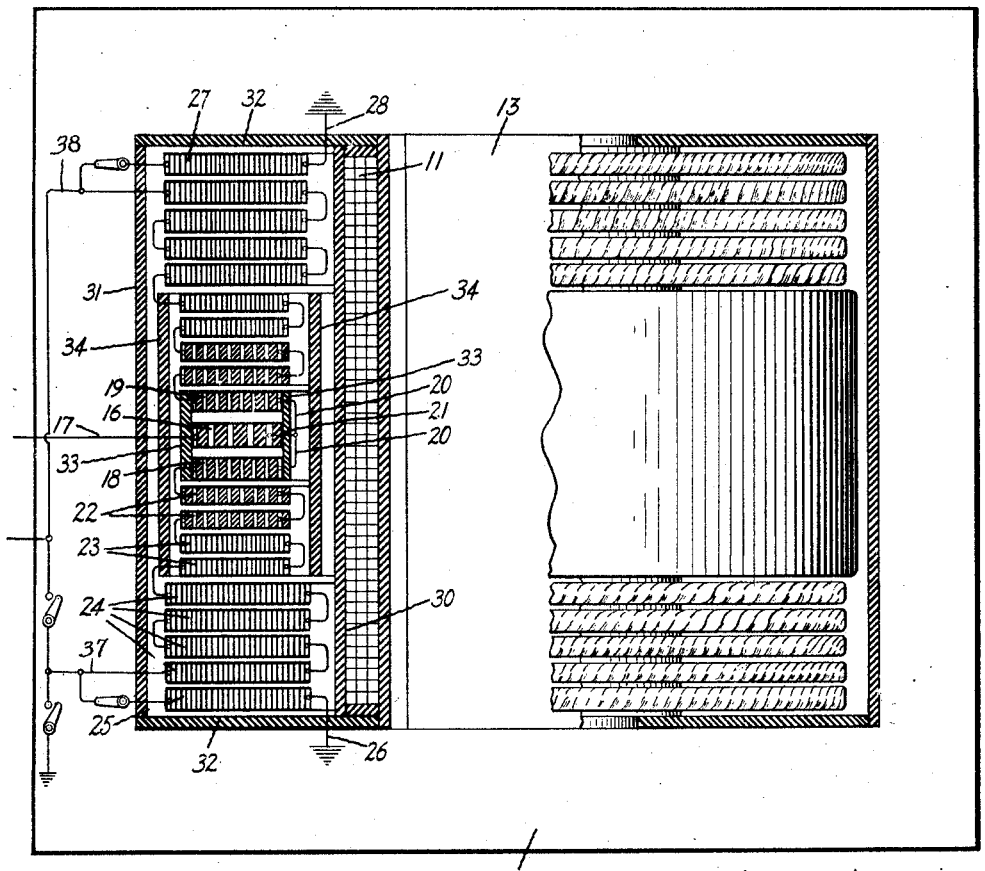
Inventor:
Howard O. Stephens,
by Albert G. Davis
His Attorney.

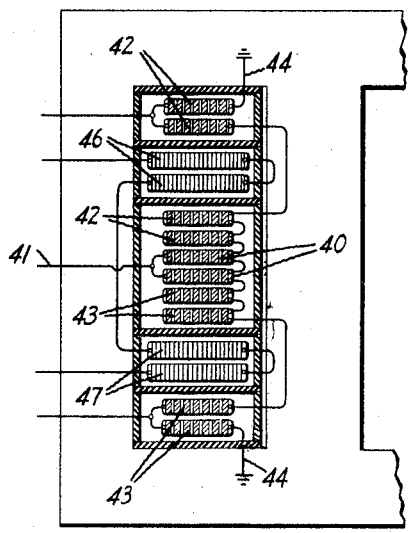
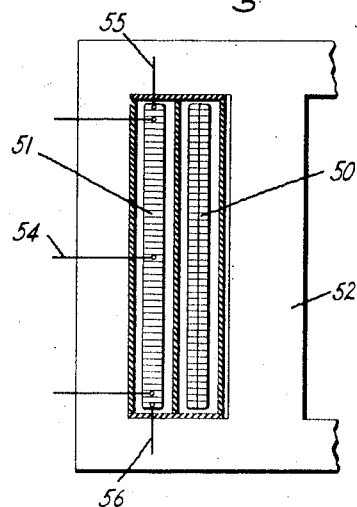

UNITED STATES PATENT OFFICE.

HOWARD O. STEPHENS, OF PITTSFIELD, MASSACHUSETTS, ASSIGNOR TO GENERAL ELECTRIC COMPANY, A CORPORATION OF NEW YORK.

ELECTRIC APPARATUS.

1,345,712.  Specification of Letters Patent.  Patented July 6, 1920.

Application filed December 18, 1916. Serial No. 137,548.

*To all whom it may concern:*

Be it known that I, HOWARD O. STEPHENS, a citizen of the United States, residing at Pittsfield, county of Berkshire, State of Massachusetts, have invented certain new and useful Improvements in Electric Apparatus, of which the following is a specification.

My invention relates to electrical apparatus in general, particularly transformers, and especially to the windings thereof. An object of my invention is to improve the construction of such apparatus.

I accomplish the object of my invention principally by a rearrangement of the windings. According to my invention windings are so arranged that one terminal of a winding involving my invention is located at substantially the center of that winding, the opposite ends of that winding in effect being connected together and together providing the opposite terminal of the winding. From another aspect my invention contemplates a winding in which the turns are so arranged and connected as to conduct current in the same directions about the flux path from the two ends of the winding to substantially the center thereof; from still another aspect my invention may be regarded as contemplating two mutually inductively related windings, as windings about a single flux path, in which the current simultaneously enters both windings at the two ends of the windings adjacent to each other and traverses both windings in the same directions about the flux path. My invention has numerous advantages some of which are enumerated toward the end of the descriptive portion of this specification. My invention is applicable both to high current and high voltage apparatus and windings, and especially those in which a plurality of conductors are used in parallel and those having a ground connection.

My invention will be thoroughly understood and its particular and peculiar application to transformers will appear from the following detailed description of certain transformer constructions embodying it. Figure 1 illustrates quite simply, partially in section and partially in elevation, a transformer embodying my invention. Figs. 2 and 3 are sections of parts of other transformer constructions embodying my invention. Fig. 4 diagrammatically illustrates a further application of my invention to transformers.

The transformer of Fig. 1 is particularly designed for high voltage work; one end is grounded and it may be used as one of three transformers Y-connected on the high voltage side with the neutral grounded. The core 10 of this transformer is of the well known three-legged type, the primary and secondary windings being placed about the middle leg 13. The low voltage winding 11 is generally cylindrical in form and lies nearer the core leg 13. Outside of the low voltage winding 11 is placed the high voltage winding which is constructed in accordance with my invention. This high voltage winding comprises a number of disks or fairly thin flat coils, of one turn of the conductor per layer, placed concentric with the low voltage winding 11 and distributed along their common winding axis. The coil 16 is a terminal coil of the high voltage winding, its outer turn being connected to the terminal 17 of the winding. The two coils 18 and 19 at the opposite sides of and adjacent the terminal coil 16 are similar to each other, and the interior terminals 20 of these coils are connected together and together connected to the interior terminal 21 of the terminal coil 16. The coils 18, 22, 23, 24 and 25 comprise the portion of the high voltage winding between the coil 16 and one end of the winding space; likewise the coil 19, coils like 22, 23, and 24, together with the coil 27, comprise the portion of high voltage winding between the coil 16 and the opposite end of the winding space. The interior terminals of the terminal coils 25 and 27 are grounded by being connected to the core at 26 and 28 respectively. The coils of each of the two groups at opposite sides of terminal coil 16 are connected together in series between the terminal coil 16 and the grounded terminal 26 or 28, as appears from the drawing. The coils are so wound, arranged and connected that the turns progress about the winding axis (and hence the flux path) from the terminals 17 to the end at 26 in the same direction as the turns progress about the winding axis from the terminal 17 to the opposite end at 28. In this winding then, the coils are so wound, arranged and connected as to conduct current in the same direction about the flux path (here the middle leg 13 of the core) from the terminal 17 to the two ends of the windings at 26 and 28. The magnetic flux resulting from the current in the upper group of coils is therefore in the same direction as the magnetic flux resulting from the current in the lower group of coils, and the two portions of the winding are in parallel and are readily made to divide equally between themselves the total current passing over the terminal 17.

As before mentioned the transformer illustrated in Fig. 1 is particularly adapted to be one of three transformers on a three-phase system, Y-connected on the high voltage side. The terminal 17 is the line terminal. The terminals 26 and 28 are, in effect, connected together, and together provide the opposite terminal of the high voltage winding, which for Y-connected transformers would be connected to similar terminals of the other transformers to provide the middle or neutral point of the Y. In addition to terminals 26 and 28 the winding stack may be provided with taps, as shown at 37 and 38, and explained hereinafter. The terminal coil 16 being directly connected to the line, is extra heavily insulated between turns and acts as the so-called "buffer coil" of the high voltage winding. The three coils immediately at each side of this coil 16 are also unusually heavily insulated between turns, but the insulation between the turns of these latter coils is of somewhat less strength than the insulation between the turns of the coil 16 in accordance with usual practice. The remaining coils of the high voltage winding are insulated alike and substantial for normal voltage in accordance with the usual practice.

This transformer illustrates the peculiar adaptability of windings of my invention to the so called "tapered" insulation thereof. The coils 16, 18 and 19 are of the smallest external diameters and the greatest internal diameters of any of the coils of this winding; the coils 22 and 23 (and the like coils at the opposite side of the winding) are of greater external and smaller internal diameters, and the coils 24 and 25 (and the coils like them at the opposite side of the winding, including the coil 27) are of still greater external diameters and smaller internal diameters. The coils are all centered about the core leg 13. The respective coils are therefore spaced from both the leg 13 and the external legs of the core, distances which are something like proportional to the differences of potential between the respective coils and the core. An insulating cylinder 30 surrounds the exterior of the low voltage winding 11 for the whole length thereof. A similar insulating cylinder 31 (or at least two insulating plates) similarly insulate the high voltage winding from the outer legs of the core by extending along the inner surfaces of these legs substantially from one yoke of the core to the other. Over the inner faces of the yokes are disposed the insulating plates 32 which sufficiently insulate the winding from the yokes since the voltage to be withstood here is substantially the voltage of one coil. Insulating cylinders 34, shorter than the cylinder 30, are disposed within and without the eleven middle coils of the high voltage winding and still shorter insulating cylinders 33 within and without the winding span the three middle coils. These insulating cylinders and the spacing of the coils substantially complete the insulation between the high voltage winding on the one hand and the low voltage winding and the core on the other hand. Where the potential difference between the high voltage winding and ground (core and low voltage winding) is to be expected to be of the greatest value, that is adjacent coils 16, 18 and 19, there the insulation is the greatest, where this difference is of an intermediate value, as adjacent coils 22 and 23, there the insulation is of an intermediate value; and likewise where this difference is of the lowest value, at coils 24 and 25, there the insulation is likewise of the lowest value. It will be observed that this difference in insulation strength, "tapering," is secured very simply with this type of winding, with a small amount of material, minimum number of pieces, pieces of simple shape, and minimum lost winding space, and substantially no winding space is lost in securing the necessary distance between the line terminal coil and the yokes.

As before mentioned, taps may be used for varying the number of active turns in a winding embodying my invention, such taps generally being used in pairs. At 37 and 38 I have shown two taps constituting one such pair. These taps are connected respectively to the external terminals of the coils 25 and 27 and at equal distances from the ends of the windings at 26 and 28; that is the number of turns between the tap 37 and the end 26 is substantially equal to the number of turns between the tap 38 and the end 28. To decrease the number of active turns in the high voltage windings, the connections of the winding to the coil at 26 and 28 are opened, and the taps 37 and 38 are connected together (as by being connected to the core) and together used as a winding terminal. It will be observed that the winding of my invention may be provided with taps which do not disturb or shift the magnetic center of the winding in their use. Furthermore the taps may be many times (as in the present instance) located adjacent low voltage parts of the winding, and hence readily insulated.

The transformer of Fig. 2 embodies my invention in a somewhat modified form; this transformer is of the interleaved disk coil type. The high voltage winding again is constructed in accordance with my invention and comprises two line terminal coils 40, the coils 42 at one side thereof and the coils 43 at the opposite side thereof. The line terminals of the coils 40 are connected together and together connected to one terminal 41 of the transformer. One of the coils 40 and the coils 42 are connected in series, and likewise the other coil 40 and the coils 43 are connected in series; the otherwise unconnected ends of the coils 42 and 43 are connected to the core. All these turns and coils are so disposed arranged and connected that current flows from the terminal 41 and through the terminal coils 40 and the coils 42 and 43 toward the two grounded ends 44, in a single direction about the winding axis as in the preceding case. The low voltage winding comprises the coils 46 and 47 interleaved respectively between certain of the coils 42 and certain of the coils 43. The low voltage coils are shown connected in series in the usual manner. In this transformer no attempt at tapering the insulation has been made. A pair of taps for securing one change in the transformation ratio is illustrated.

The transformer illustrated in Fig. 3 is of the so-called concentric cylinder type and the low voltage winding is constructed in accordance with my invention in this instance. The primary winding 50 and the secondary winding 51 (the low voltage winding) are substantially in the form of cylinders and are concentrically disposed about the middle leg 52 of the transformer core. The winding 50 is of the usual form, the terminals being at the ends of the winding. The turns of the winding 51 however progress in the same direction about the winding axis from the terminal 54 to the two ends of the winding at 55 and 56 as in the former cases; as before the two ends 55 and 56 of the winding together constitute the terminal of the winding opposite the terminal 54. The manner in which the turns are arranged about the winding axis in this case appears more clearly in Fig. 4, winding 60. This transformer illustrates the application of my invention to high current windings where a number of balanced parallel connected conductors are desired.

Fig. 4 illustrates another modification in that the winding 60 embodying my invention is disposed on two legs of the core. The terminals of this winding are at 61 and 62. From the terminal 61 the winding progresses in the same direction about the adjacent core leg toward the two ends of the adjacent portion of the winding; the turns of the winding on the opposite core leg progress in a like manner from the terminal 62 to the two ends of that portion of the winding. The turns of the portions of the winding on the opposite legs, are so related as to tend to produce flux in the same direction about the core when current enters at one terminal (61 or 62) and simultaneously leaves at the other; these portions of the winding are connected together at 68 and 69, the ends thereof adjacent the yokes. The low voltage winding 70 of the transformer of this figure is arranged and disposed in a usual manner. The winding 60 is provided with taps at 64, 65, 66, and 67. These taps are located at equal distances from the adjacent middle terminals (and likewise at equal distances from the connections 68 and 69). To reduce the number of active turns in this winding, the connections of the two windings are broken adjacent 68 and 69 and the tap 64 is connected to tap 65 and the tap 66 is connected to tap 67.

It will appear from what has gone before that my invention possesses or results in numerous advantages over the prior practice; among these advantages may be enumerated the following, some of which have been indicated before:—It provides a system of parallel connected conductors which are readily balanced, that is, made to divide the total current substantially equally among themselves which is a particularly desirable distribution for the charging current component since the central connection offsets in large measure the effects of the end yokes on the shunted capacity to ground for the windings and permits a closer approach to the ideal logarithmic distribution of the initial electrostatic charge. The winding is readily insulated, and generally requires a minimum amount of material and space. The ends of the windings adjacent the end iron of the core are of low potential (in many cases) and it is therefore (in such cases) necessary to insulate the coils from the end iron only for this low voltage; from this there results a saving in the amount of insulating material required and a considerable saving in the amount of iron since the length of the window is materially decreased. The line or highest potential is (in many cases) at the center of the winding and a continuous barrier may insulate this point of the winding from the low voltage and the iron, eliminating the necessity of expensive and elaborate collars, or otherwise unnecessary extensions of the insulation, between the two windings (or between the winding of my invention and the ground) to prevent arcing along the insulation to the low voltage winding or ground. With the usual transformer construction in which one end of the high voltage winding is directly connected to the line, in order to extra insulate the end turns of the high voltage winding, the magnetic center of the high voltage winding is shifted below (or above) the magnetic center of the adjacent low voltage winding, thus tending to increase the magnetic forces in the transformer under the short circuit conditions; upon the other hand, a transformer embodying my invention may have its end coil (or coils) extra heavily insulated and may be provided with tapered insulation throughout while the magnetic centers of high voltage winding and low voltage winding are maintained opposite each other. The windings of my invention may be more readily and strongly supported since it is unnecessary to provide the supports with high insulation strength; heavy metal coil supports may be used insulated only for the adjacent coil voltage.

Hereinbefore and in the following claims I have had occasion to use the terms "primary winding" and "secondary winding;" these terms are used merely for the sake of clearness and in order to readily differentiate between the two windings of a transformer. It will be understood that in practice either winding may be the primary winding and the other the secondary winding.

While I have described the principle of my invention and the best mode I have contemplated for applying this principle other modifications will occur to those skilled in this art and I aim in the appended claims to cover all modifications which do not involve a departure from the spirit and scope of my invention.

What I claim as new and desire to secure by Letters Patent of the United States, is:

1. A stack of electrical windings having a single rectilinear winding axis and provided with a terminal near the center thereof, the two ends of the windings being connected together and together providing the opposite terminal of said windings, the turns of said windings being connected and arranged to conduct current in a single direction about said winding axis in two paths from the center terminal of the winding to the opposite terminal thereof.

2. A stack of electrical windings comprising a plurality of disk coils, having a terminal connection adjacent the center of the stack and assembled to have a single rectilinear winding axis about which the turns of said coils are arranged to conduct current in a single direction in parallel paths one at each side of said terminal connection, the ends of said stack being connected together and to the other terminal.

3. A stack of electrical windings comprising a plurality of disk coils having a single rectilinear winding axis, one terminal of a disk coil adjacent the center of the windings being a terminal of the windings and the other terminal of that coil being connected to the two coils adjacent that coil, the coils at the two sides of said terminal coil being respectively connected in series and connected and arranged to conduct current in the same direction about the winding axis from said terminal coil to the two ends of the windings.

4. A stack of electrical windings comprising a plurality of disk coils having a single rectilinear winding axis, one terminal of a disk coil adjacent the center of the windings being a terminal of the windings and the other terminal of that coil being connected to the two coils adjacent that coil, said terminal coil being extra heavily insulated, the coils at the two sides of said terminal coil being respectively connected in series and arranged to conduct current in the same direction about the winding axis from said terminal coil to the two ends of the windings.

5. A stack of electrical windings comprising a plurality of disk coils having a single rectilinear winding axis, one terminal of a disk coil adjacent the center of the windings being a terminal of the windings and the other terminal of that terminal coil being connected to the two coils adjacent that coil, said terminal coil being extra heavily insulated, the coils at the two sides of said terminal coil being connected and arranged to conduct current in parallel paths in the same direction about the axis of the winding from said terminal coil to the two ends of the windings, and being provided with two taps adjacent the ends of the windings, one at each side of the terminal coil and equally spaced therefrom.

6. A stack of electrical windings comprising a plurality of disk coils having a single rectilinear winding axis, one terminal of a disk coil adjacent the center of the windings being a terminal of the windings and the other terminal of that terminal coil being connected to the two coils adjacent that coil, said terminal coil being extra heavily insulated, the coils at the two sides of said terminal coil being connected and arranged to conduct current in the same direction about the axis of the windings from said terminal coil to the two ends of the windings, and the two ends of the windings being grounded.

7. A stack of electrical windings provided with a terminal near the center thereof, the two ends of the windings being connected to ground, the turns of said winding being connected and arranged to conduct current in the same direction about the flux path from said terminal of the windings to the two connections to ground, and said windings being further provided with a tap adjacent each grounded end, the two taps being equally spaced from the grounded ends of the windings.

8. A stack of electrical windings provided with a terminal near the center thereof, the two ends of the windings being connected to the ground, the turns of said windings being connected and arranged to conduct current in the same direction about the flux path from said terminal of the windings to the two connections to ground, and the insulation decreasing in value from the center terminal toward the ends of the windings.

9. A stack of electrical windings having a single rectilinear winding axis and provided with a terminal near the center thereof, the two ends of the windings being connected to ground, the turns of said windings being connected and arranged to conduct current in parallel paths in a single direction about said winding axis; there being one path on each side of the stack leading from the terminal connection at the center of said windings.

10. A transformer comprising a core, and primary and secondary windings about a leg of the core, said primary winding comprising a plurality of disk coils, one terminal of a coil adjacent the center of the winding being a terminal of the primary winding and the other terminal of that coil being connected to the two coils adjacent that terminal coil, said terminal coil being extra heavily insulated, the coils at the two sides of said terminal coil being connected and arranged to conduct current in the same direction about said core leg from said terminal to the two ends of the winding and the two ends of that winding being grounded.

11. A transformer comprising a core, and primary and secondary windings about a leg of the core, said primary winding comprising a plurality of disk coils, one terminal of a coil adjacent the center of the winding being a terminal of the primary winding and the other terminal of that coil being connected to the two coils adjacent that terminal coil, said terminal coil being extra heavily insulated, the coils at the two sides of said terminal coil being connected and arranged to conduct current in the same direction about said core leg from said terminal to the two ends of the winding, the two ends of that winding being grounded, and the winding being provided with two taps adjacent the grounded ends thereof, one at each side of the terminal coil and equally spaced therefrom.

12. A transformer comprising a core, primary and secondary windings about a leg of the core, the primary winding being provided with a terminal near the center thereof and the turns of said winding being connected and arranged to conduct current in the same direction about said leg of the core from said terminal to the two ends of the winding, an insulating cylinder between said primary winding and core leg and another materially shorter insulating cylinder also between said primary winding and core leg, the two ends of the second mentioned insulating cylinder being at substantially equal distances from the respective adjacent ends of the winding.

In witness whereof I have hereunto set my hand this 12th day of Dec., 1916.

HOWARD O. STEPHENS.